United States Patent
Hamilton

(10) Patent No.: US 6,621,514 B1
(45) Date of Patent: Sep. 16, 2003

(54) VIDEO CONFERENCING SYSTEM

(75) Inventor: Chris Hamilton, Montclair, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/041,155

(22) Filed: Mar. 12, 1998

(51) Int. Cl.$^7$ ................................................ H04N 7/14
(52) U.S. Cl. .................... 348/14.09; 348/14.11; 370/261
(58) Field of Search .................. 348/12–16; 379/93.05, 379/93.09, 93.21, 202; 709/204, 217; 370/260, 493–496, 261; 345/329–330; 375/222

(56) References Cited

U.S. PATENT DOCUMENTS

| | | | | |
|---|---|---|---|---|
| 4,987,492 A | * | 1/1991 | Stults et al. ................... | 348/15 |
| 5,014,267 A | * | 5/1991 | Tompkins et al. .......... | 370/259 |
| 5,510,829 A | * | 4/1996 | Sugiyama et al. ....... | 348/14.01 |
| 5,559,868 A | * | 9/1996 | Blonder ................... | 348/14.01 |
| 5,684,825 A | * | 11/1997 | Ko .............................. | 370/493 |
| 5,745,161 A | * | 4/1998 | Ito .......................... | 348/14.09 |
| 5,761,280 A | * | 6/1998 | Noonen et al. .......... | 379/93.05 |
| 5,767,897 A | * | 6/1998 | Howell ......................... | 348/15 |
| 5,774,457 A | * | 6/1998 | Iizawa ....................... | 379/202 |
| 5,793,365 A | * | 8/1998 | Tang et al. .................. | 345/329 |
| 5,841,763 A | * | 11/1998 | Leondires et al. .......... | 370/260 |
| 5,884,039 A | * | 3/1999 | Ludwig et al. ............. | 370/261 |
| 5,922,047 A | * | 7/1999 | Newlin et al. .............. | 709/217 |
| 5,936,662 A | * | 8/1999 | Kim et al. ..................... | 348/15 |
| 5,963,246 A | * | 10/1999 | Kato ........................ | 348/14.09 |
| 6,011,782 A | * | 1/2000 | DeSimone et al. ......... | 370/260 |
| 6,020,915 A | * | 2/2000 | Bruno et al. ............. | 348/14.09 |
| 6,228,739 B1 | * | 5/2001 | Hales et al. ............. | 348/14.07 |
| 6,404,745 B1 | * | 6/2002 | O'Neil et al. ............ | 348/14.09 |

FOREIGN PATENT DOCUMENTS

| | | | | |
|---|---|---|---|---|
| JP | 02228158 A | * | 9/1990 | ............ H04M/9/00 |
| JP | 03183288 A | * | 8/1991 | ............ H04M/7/15 |

* cited by examiner

*Primary Examiner*—George Eng
(74) *Attorney, Agent, or Firm*—Blakely, Sokoloff, Taylor & Zafman LLP

(57) ABSTRACT

An improved video conferencing system debundles the audio and the video and allows for a user to select which other conference stations will receive audio, which will receive video and which will receive both.

10 Claims, 2 Drawing Sheets

VIDEO CONFERENCING SYSTEM

TECHNICAL FIELD

The present invention relates to video conferencing, and more specifically, to an improved technique of providing flexible video conferencing systems by allowing a party to the conference to specify various portions of a signal being transmitted from its conference station which are to be received by other conference stations.

BACKGROUND OF THE INVENTION

Video conferencing systems have come into widespread use in the past several years, particularly with the merging of computers and telecommunications. Specifically, there are now numerous personal computer type devices which can enable video conferencing over a telephone and/or data network. With Internet use growing at the rapid rate recently exhibited, it is expected that video conferencing systems will be even more widely used.

Basic video conferencing involves capturing audio and video information and transmitting the captured signals to one or more of other users in the conference. Each user in the conference receives and views one or more images, one being transmitted from each of the other conferees. The audio information from any conferee is typically broadcast to all other conferees.

In prior art video conferencing systems, the image and audio from a plurality of video cameras are merged by a conference bridge and transmitted to the numerous conference participants. Typically, the conference bridge and network indiscriminately mix all of the signals from each of the different video camera stations and transmit a composite image to the other stations. There exists no known technique of allowing any one or more users to control the particular signals received by any other conference station.

SUMMARY OF THE INVENTION

The above problems are overcome in accordance with the present invention which relates to a technique of permitting conferees to selectively transmit different portions of signals to different conferees. Specifically and with reference to FIG. 1, an exemplary conference among conference stations 101 through 104 is shown implemented via a conference bridge and connections 106 through 109. Such connections may be facilitated over a data network.

In operation, each conference station 101 to 104 may debundle its outgoing signals so that the video and audio, as well as any other portions thereof, are separable by conference bridge 105. Each of the conference stations 101 through 104 may then transmit signals indicating which of the other conferees should receive the audio, which should receive the video, and which should receive both.

DETAILED DESCRIPTION OF THE PREFERRED EMBODIMENT

Figure 1:
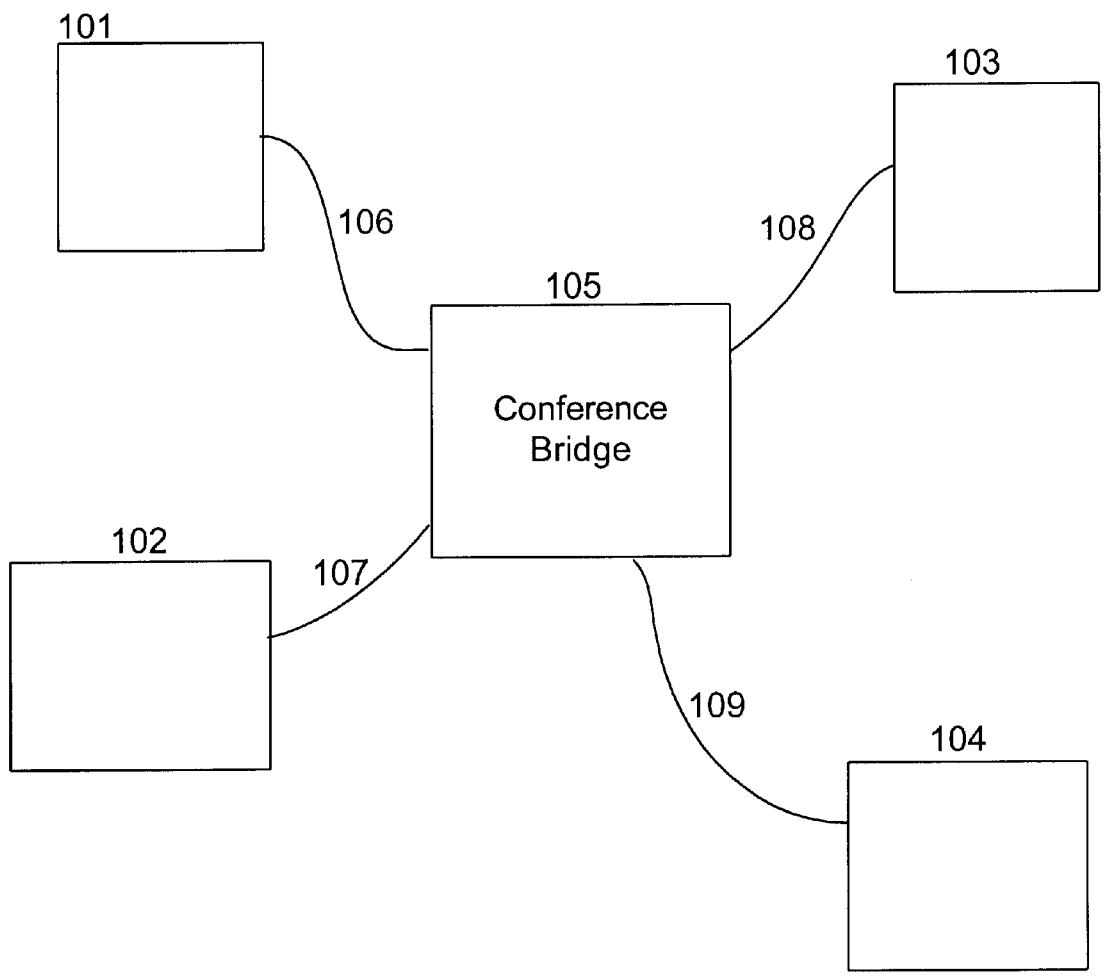
FIG. 1 depicts a plurality of conference stations 101 through 104 interconnected via a conference bridge 105.

FIG. 1 shows a conference bridge 105 interconnecting a plurality of conference stations 101 through 104. Although the conference stations are shown as each being connected to the conference bridge via a separate, dedicated connection, in fact, each may be connected via the telephone or a data network.

Figure 2:
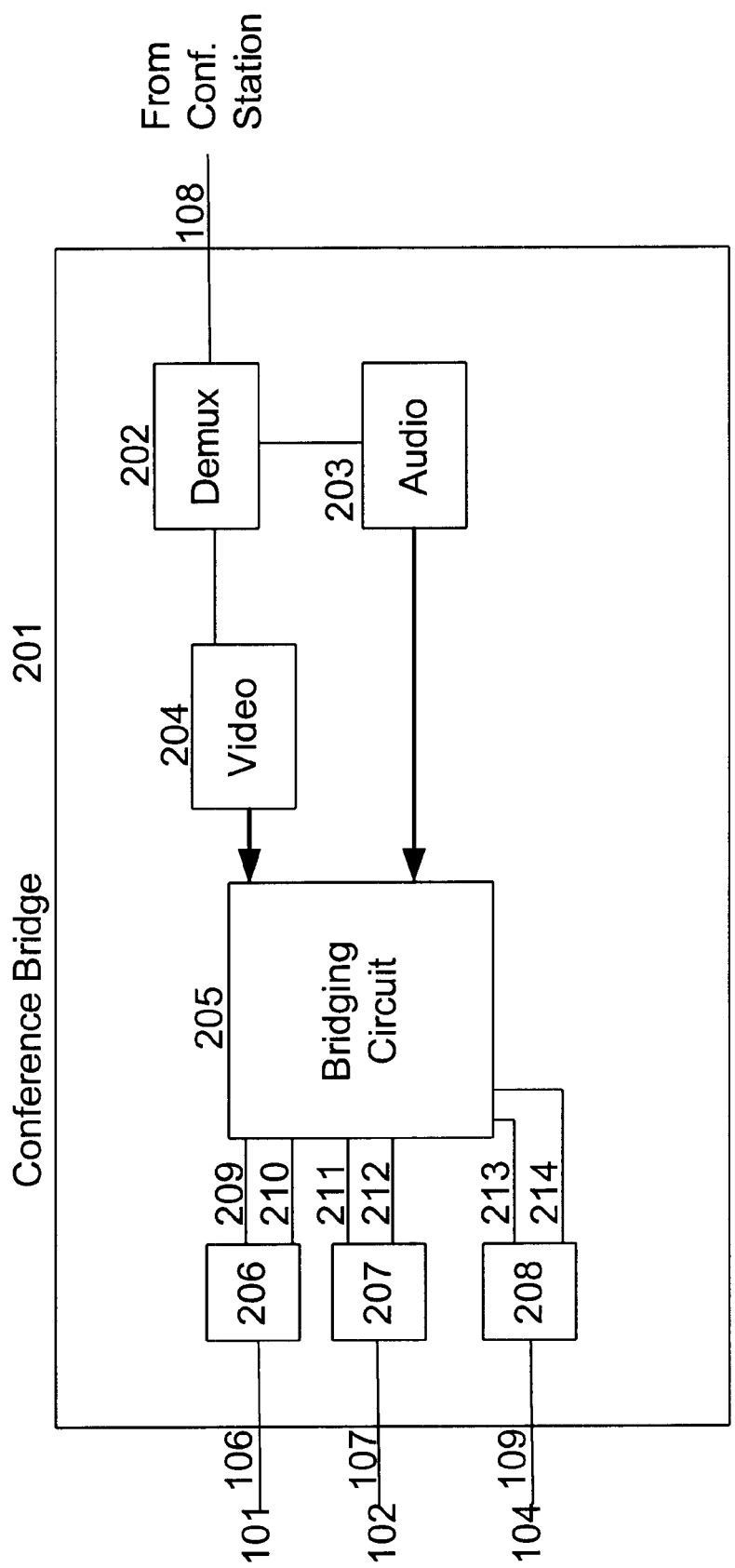
FIG. 2 depicts a high level functional diagram of an exemplary bridging arrangement for implementing the techniques of the present invention.

FIG. 2 shows a high level block diagram of an exemplary arrangement for implementing the techniques of the present invention. The system of FIG. 2 includes a conference bridge 201, an exemplary demultiplexer 202, audio and video processing 203 and 204, respectively, and a bridging circuit 205. Additionally, shown therein are three exemplary conference station interfaces 206, 207 and 208.

In a practical system, there would be both a conference station interface (i.e., 206) and a demultiplex, audio, and video block for each conferee. For purposes of explanation and simplicity, FIG. 2 does not show all of these items as associated with each conference station.

In operation, a signal arrives from a conference station over a communications link 108 and is demultiplexed by demultiplexer 202. The demultiplexer is arranged to separate the audio from the video and may operate in accordance with theories of frequency division multiplexing, time division multiplexing, or any other technique. The video and audio are sent separately for processing to blocks 204 and 203 respectively, as indicated in FIG. 2.

The bridging circuit 205 then receives both audio and video signals and, based upon its configuration as previously programmed, routes either the video, the audio, or both over communications lines 209 through 214 to conference station interfaces 206 through 208. Each of the conference station interfaces 206 through 208 then multiplexes the audio and video signals together and transmits it out onto the communications lines 106, 107 and 109 for transmission to its corresponding conference station.

Bridging circuit 205 is a microprocessor controlled interconnection which is programmed via any suitable technique. For example, selection signals may be sent from the conference stations 101 through 104 at the beginning of the conference. Based upon such selection signals, the system determines which audio and video signals should be routed to which conference stations. For example, at the start of the conference, bridging circuit 205 could sequentially prompt each of the conference stations. First, the telephone numbers or data network addresses of all of the conference stations are obtained or inputted to bridging circuit 205 in accordance with any conventional technique. Bridging circuit 205 then sends a message to conference station 106 listing the three other conference stations and requesting a response regarding whether each of the conference stations should receive audio, video, or both. This prompting can be done via the telephone and touchtone entries, or via the computer interface with the user of each conference stations filling out a template.

After receipt of the appropriate information from each of the conference stations 101 through 104, bridging circuit 205 is then configured to convey the appropriate connections such that the video and audio are transmitted to the appropriate other conference stations. For example, if conference station 101 requests that its audio be sent to all other conference stations but its video only be sent to conference station 104, then bridging circuit 205 would configure itself to accomplish the same. Specifically, bridging circuit 205 would receive the input from video and audio processing 204 and 203 and transmit the audio to lines 209, 211 and 213. The video, however, would only be transmitted to line 214, but not line 210 and 212 such that the multiplex signal on lines 106 and 107 will contain no video.

In addition to prompting the users, the bridge may be configured in advance or the bridging circuit may actually be resident at one of the conference stations. The "master conference station" would then determine which conference stations receive audio and which receive video from each of the other conference stations.

While the above describes the preferred embodiments, various other modifications and additions will be apparent to those of skill in the art.

What is claimed is:

1. A video conferencing system for implementing a video conference, said system comprising:

a conference bridge;

a plurality of conference stations, each configured to transmit a combined signal comprising a video portion and an audio portion to the conference bridge, at least one of said plurality of conference stations including means to select whether each one of other conference stations participating in the video conference receives, independent of each other among said other conference stations, one of the audio portion only, the video portion only and both audio and video portions of said combined signal.

2. The system of claim 1 wherein said means for selecting includes means for displaying a template on a computer screen and for allowing a user to select, from the template and for each user, whether said each user will receive audio, video, or both.

3. The system of claim 1 wherein said means for selecting includes means for prompting a user to enter telephone digits indicative of said user's selection, and for conveying said telephone digits to said conference bridge.

4. The audio conferencing system of claim 1, wherein said at least one station is one of said plurality conference stations that transmits said combined video and audio signal.

5. The audio conferencing system of claim 1, wherein said at least one station is a station other than one of said plurality conference stations that transmits said combined video and audio signal.

6. A video conference station for use in implementing a video conference comprising:

means for transmitting a combined audio and video signal comprising a video portion and an audio portion to a conference bridge; and means for generating and transmitting to the conference bridge a selection signal indicative of whether each one of a plurality of remote conference stations participating in the conference receives, independent of each other among said remote conference stations, one of the audio portion only, the video portion only and both the audio and video portions of said combined audio and video signal.

7. The video conference station of claim 6 wherein said selection signal comprises as least one DTMF tone.

8. The video conference station of claim 6 further comprising means for permitting a user to complete a template on a computer screen to select whether each of said plurality of remote users receives video or audio or both.

9. A video conferencing system for implementing a video conference, said system comprising:

a conference bridge;

a plurality of conference stations, each configured to transmit a combined signal comprising a video portion and an audio portion to the conference bridge, at least one of said plurality of conference stations including a selector to select whether each one of other conference stations participating in the video conference receives, independent of each other among said other conference stations, one of the audio portion only, the video portion only and both audio and video portions of said combined signal.

10. A video conference station for use in implementing a video conference comprising:

a transmitter to transmit a combined signal comprising a video portion and an audio portion to a conference bridge; and a generator to generate and transmit to the conference bridge a selection signal indicative of whether to transmit each one of a plurality of remote conference stations participating in the conference, independent of each other among said remote conference stations, one of the audio portion only, the video portion only and both the audio and video portions of said combined signal transmitted by said transmitter.

* * * * *